June 16, 1931.  H. J. BURNISH  1,810,005

METHOD OF ARC WELDING

Filed Nov. 29, 1929

INVENTOR.

Howard J. Burnish

BY Elvin A. Andrus

ATTORNEY.

Patented June 16, 1931

1,810,005

UNITED STATES PATENT OFFICE

HOWARD J. BURNISH, OF MILWAUKEE, WISCONSIN, ASSIGNOR TO A. O. SMITH CORPORATION, OF MILWAUKEE, WISCONSIN, A CORPORATION OF NEW YORK

METHOD OF ARC WELDING

Application filed November 29, 1929. Serial No. 410,479.

This invention relates to a method of arc welding and has particular relation to the preliminary tack welding of abutting edges of sheets to be welded.

An object of the invention is to provide a method of tack welding which allows a substantially uniform susequent welding operation.

A further object is to provide a method of arc welding which will produce a weld of uniform quality.

The invention resides in providing a plurality of recesses or openings at spaced intervals along the seam to be welded, for receiving the deposited tack welding metal.

The invention may be more readily understood by reference to the accompanying drawings in which.

Figure 1:
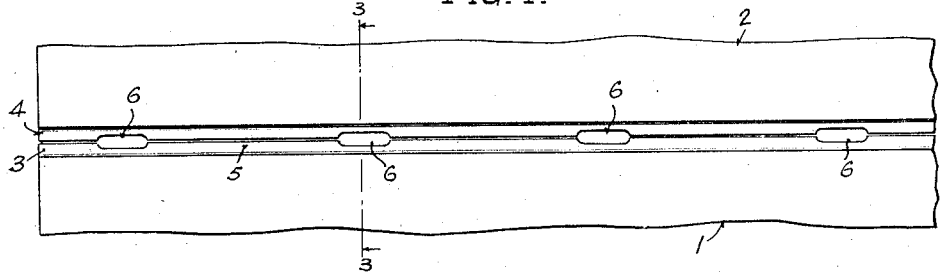
Figure 1 is a plan view of the abutting edges in position for welding.
Figure 2:
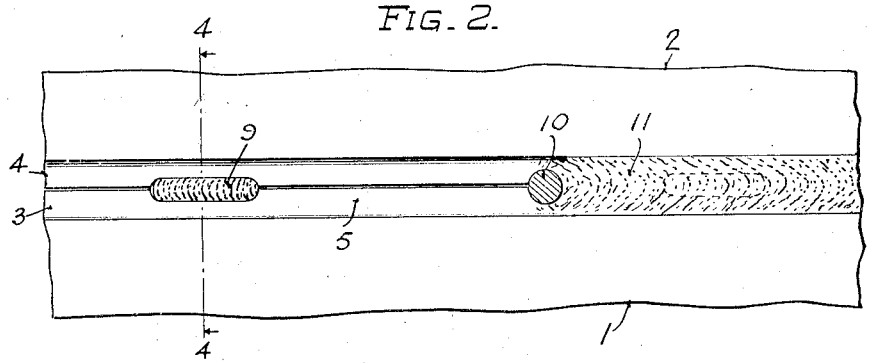
Fig. 2 is a plan view of a completed tack weld between the edges showing a portion of the edges welded.
Figure 3:
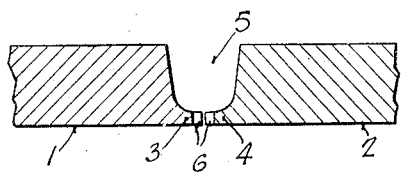
Fig. 3 is a section on line 3—3 of Fig. 1.
Figure 4:
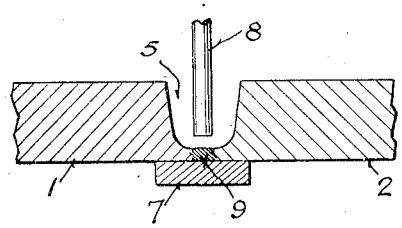
Fig. 4 is a section on line 4—4 of Fig. 2.
Figure 5:
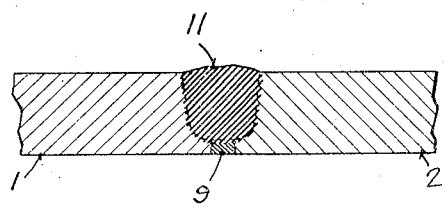
Fig. 5 is a transverse section of the finished weld.

The sheets 1 and 2 have their edges to be welded chamfered to form lips 3 and 4 which meet in abutting relation and provide a welding groove 5 above the lips 3 and 4. The abutting lips 3 and 4 have a plurality of openings or recesses 6 at spaced intervals therein.

In carrying out the invention, a chill member 7 is placed beneath each recess or opening 6. The sheets 1 and 2 are then tack welded together by striking an arc between the sheets and a fusible metallic weldrod 8 and filling the openings or recesses 6 with welding metal 9 deposited by means of the arc from the weldrod 8.

In the subsequent welding operation an arc is struck between the lips 3 and 4 at the bottom of the welding groove 5 and a fusible metallic weldrod 10, and a sufficient number of passes are made along the groove 5 to fill it with molten welding metal 11 and complete the weld.

The tack welds 9 do not interfere with the passage of the weldrod 10 or the welding arc along the welding groove 5 since the welding metal of the tack welds does not extend appreciably above the level of the upper surfaces of the lips 3 and 4 and therefore the weldrod 10 will require a minimum of regulation in feed and a more uniform weld will be produced.

The invention may have various modification within the scope of the claims.

I claim:

1. In arc welding, the steps which comprise providing recesses in the metal to be welded at spaced intervals along the abutting edges of the seam and filling said recesses with welding metal to tack the metal to be welded in position for final welding.

2. The method of arc welding the edges of abutting sheets of metal which comprises providing recesses in the metal of the edges at spaced intervals along the seam to be welded, tack welding the sheets by filling said recesses with welding metal, and thereafter passing an electric arc along the seam to weld the same.

3. The method of arc welding metal which comprises chamfering the abutting edges and providing recesses therein at spaced intervals along the seam to be welded, tack welding the sheets by filling said recesses with welding metal, and thereafter passing an arc along the seam to weld the same.

4. The method of arc welding which comprises chamfering the abutting edges to be welded to form a welding groove closed at the bottom by lips of reduced thickness, providing recesses in the lips at intervals along the seam, tack welding the sheets by filling said recesses with welding metal substantially flush with the upper surfaces of said lips, and thereafter depositing welding metal in said welding groove to complete the weld.

5. The method of arc welding the edges of abutting sheets of metal which comprises providing recesses at intervals along the seam to be welded, tack welding the sheets by depositing metal in said recesses substantially flush with the upper surface of the metal to be welded, and thereafter passing an arc along the seam to weld the same.

In witness whereof, I have hereunto signed my name at Milwaukee, Wisconsin, this 27th day of November, 1929.

HOWARD J. BURNISH.